UNITED STATES PATENT OFFICE.

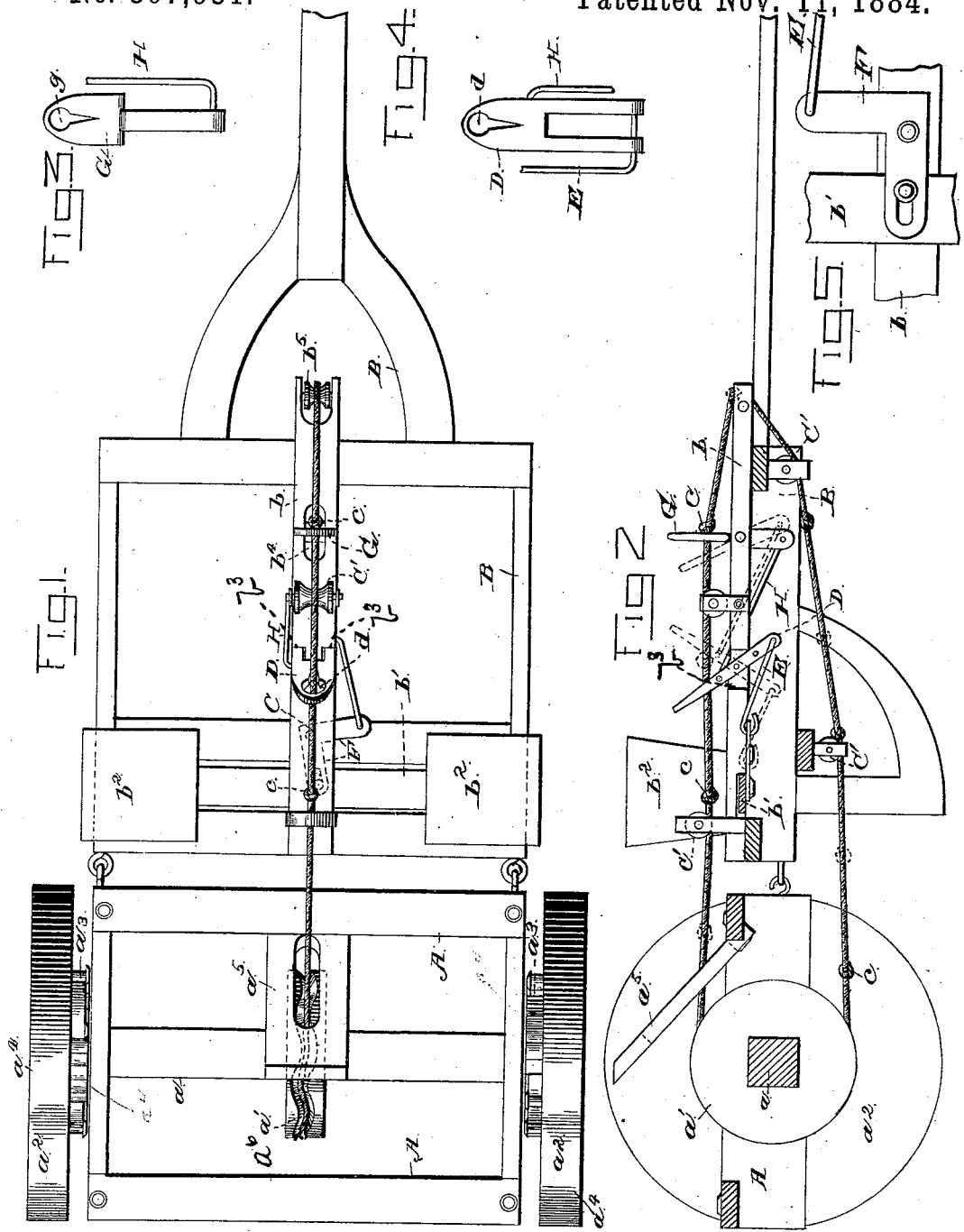

OSCAR J. ENSIGN, OF KAHOKA, MISSOURI.

CHECK-ROWER.

SPECIFICATION forming part of Letters Patent No. 307,931, dated November 11, 1884.

Application filed July 26, 1884. (No model.)

*To all whom it may concern:*

Be it known that I, OSCAR J. ENSIGN, a citizen of the United States, residing at Kahoka, in the county of Clark and State of Missouri, have invented certain new and useful Improvements in Check-Rowers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The invention is a check-rower; and its object is to dispense with the long cumbersome check-row line or wire which in the usual construction is stretched across the field.

In the invention the check-row line is an endless cord or wire driven by a pulley on the axle and a pulley on the front end of the draft-frame of machine. The parts on the line actuate the upper ends of two vertical vibrating levers in a manner hereinafter explained. The said levers are linked together so as to communicate motion one to the other, and the lower end of the rear lever is linked to a crank-lever that reciprocates the slide-bar. Suitably grooved anti-friction pulleys are fixed at proper points on the machine for the endless check-row line to run in.

In the drawings accompanying and forming part of this specification, Figure 1 is a plan of the machine; Fig. 2, a side elevation of the same. Fig. 3 is a detail view of the front vertical lever. Fig. 4 is a detail view of the rear vertical lever. Fig. 5 is a detail view of the crank-lever that reciprocates the slide-bar.

In the accompanying drawings, A represents the main frame, and B the draft-frame of the machine, both of rectangular shape and hooked or hinged together, as shown.

$a$ is the axle turning in proper bearings on the main frame, and having fixed centrally upon it the pulley $a'$, which is grooved in such manner as to accommodate the knots made at equal intervals in the check-row line.

$a^2$ $a^2$ are the wheels, each having on its inner face the pawls $a^3$ $a^3$, which engage ratchet-wheels $a^4$ $a^4$, fixed on the axle, as shown. By means of these the wheels can turn on the axle only when the machine runs backward.

$a^5$ is a properly-slotted guide-piece for the check-row line, fixed in a proper position to the front beam of the main frame.

$b$ is a beam running centrally from front to rear across the upper surface of the draft-frame, and recessed transversely on its under surface just in front of the rear beam of the draft-frame for the accommodation of the slide-bar $b'$, which reciprocates between the two seed-boxes $b^2$ $b^2$.

$b^3$ are opposite lateral recesses, and $b^4$ is a slot made at proper points in the length of the beam $b$, for purposes hereinafter explained.

$b^5$ is a small pulley journaled in a longitudinal recess on the front end of the beam $b$, and carrying the front end of the check-row line.

$c$ is the check-row line, actuated by means of the pulley $a'$ from the axle, provided at proper and equal intervals in its length with the knots $c$ $c$, and supported and directed by the supplementary friction-pulley $c'$ $c'$, as shown.

$d$ is the rear vertical vibrating lever, forked at its lower end, as shown in Fig. 4, and provided at its upper end with the circular opening $d$, into the lower part of which opens a vertical V-shaped slot to give the cord free play while passing through the opening. The fork of the lever D fits down over the beam $b$ in the recesses $b^3$, and is pivoted therein. Proper transverse openings are made in the ends of the arms of the fork and in the body of the lever a short distance above the beam $b$, for the insertion of the transversely-bent ends of connecting rods or links, hereinafter more fully described.

E is a connecting rod or link, the front end of which fits and turns in the openings in the ends of the fork of the lever D. The rod then bends backward, outward, and upward, and has its rear end hooked into an opening in the end of the transverse arm of the crank-lever F, which is pivoted near its angle upon the under surface of the beam $b$, and has the end of its longitudinal arm pivoted upon the under surface of the slide-bar $b'$, the said end being slotted, as shown in Fig. 5, to allow freedom of motion.

G is the front vertical lever, having its upper end provided with an opening, $g$, and V-shaped slot, in all respects similar to the opening and slot $d$, and the lower end of which passes down into the slot $b^4$ of the beam $b$, and is properly pivoted therein.

H is a connecting rod or link, the transversely-bent rear end of which fits and turns in the opening in the lever D above the beam b. The rod thence runs forward and downward, and has its front end bent transversely, so as to fit and turn in a proper opening in the lower end of the lever G.

The openings $d$ and $g$ in the levers D and G are made of just sufficient size for the knots $c$ to bind well upon their edges before passing through, so that the levers will be moved forward to their full extent as the check-row line moves forward.

The vibration of the rear lever, D, by means of the rod E and crank-lever F reciprocates the slide-bar.

The arrangement of the rod H and levers D and G is such that when the former is moved forward by a knot the latter is thrown backward, and the reverse.

The action of a knot on the lever D moves the slide-bar in one direction, and the action on the lever G moves it in the opposite direction, and as the levers alternately approach and recede from each other it is necessary to give the rear lever, D, a further throw backward than the front lever. This is accomplished by attaching the rod H nearer to the center of motion of the former than to that of the latter.

The operation of the knot and levers is shown in Fig. 2.

It will be noticed that the groove $a^6$ in the drive-pulley $a'$ is made cam-shaped or waved throughout its length. The object of thus forming the groove is to cause it to drive the knotted cord more positively than would a continuously-straight groove, the rope not slipping because of the difficulty of moving the knots around the acute joints of the waves or bends.

By connecting the upper end of one lever directly with the lower end of the other, it will be seen I dispense with all intermediate mechanism and leave the lower end of the lever D free to be connected with the slide-actuating mechanism.

The reference to upper and lower ends of the levers is for convenience of reference, as it is manifest the said parts might be arranged in a horizontal instead of a vertical position.

Having thus described my invention, what I claim, and desire to secure by Letters Patent, is—

1. The combination, in a check-row planter, of the driving mechanism, an endless cord provided with buttons or knots and carried by the machine, and engaged with and adapted to operate the dropping mechanism, and the pulley $a'$, revolved by the operating mechanism, and provided with a groove, $a^6$, fitted to receive the endless cord, and waved from side to side, whereby the slipping of the said cord is prevented, substantially as set forth.

2. The combination of the framing, the guide-pulleys $c'$ $c'$, the levers D G, the rod H, connecting said levers, the dropping-slide, a bell-crank lever, F, having one arm connected with the dropping-slide, a link, E, connecting the other arm of the lever F with its actuating mechanism, an endless cord provided with buttons or knots and passed around pulleys $c'$, and engaging levers D G, and the driving-pulley $a'$, provided with a groove, $a^6$, fitted to receive the operating-cord, and waved from side to side, whereby slipping of said cord is prevented, all combined and arranged substantially as and for the purposes specified.

In testimony whereof I affix my signature in presence of two witnesses.

OSCAR J. ENSIGN.

Witnesses:
G. L. DREW,
R. J. WOOD.